(12) United States Patent
Lee

(10) Patent No.: US 8,750,613 B2
(45) Date of Patent: Jun. 10, 2014

(54) DETECTING OBJECTS IN IMAGES USING COLOR HISTOGRAMS

(75) Inventor: Morris Lee, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 124 days.

(21) Appl. No.: 13/324,695

(22) Filed: Dec. 13, 2011

(65) Prior Publication Data

US 2013/0148882 A1    Jun. 13, 2013

(51) Int. Cl.
    *G06K 9/00*    (2006.01)

(52) U.S. Cl.
    USPC .......................................... 382/168; 382/170

(58) Field of Classification Search
    USPC .................. 382/103, 164, 168, 171, 173, 170
    See application file for complete search history.

(56) References Cited

U.S. PATENT DOCUMENTS

| | | |
|---|---|---|
| 4,996,594 A | 2/1991 | Murayama |
| 5,426,684 A | 6/1995 | Gaborski et al. |
| 5,546,475 A | 8/1996 | Bolle et al. |
| 5,594,807 A | 1/1997 | Liu |
| 5,708,767 A | 1/1998 | Yeo et al. |
| 5,767,893 A | 6/1998 | Chen et al. |
| 5,805,733 A | 9/1998 | Wang et al. |
| 5,821,945 A | 10/1998 | Yeo et al. |
| 5,956,026 A | 9/1999 | Ratakonda |
| 5,990,980 A | 11/1999 | Golin |
| 6,157,744 A | 12/2000 | Nagasaka et al. |
| 6,185,314 B1 | 2/2001 | Crabtree et al. |
| 6,243,713 B1 | 6/2001 | Nelson et al. |
| 6,263,088 B1 | 7/2001 | Crabtree et al. |
| 6,278,989 B1 | 8/2001 | Chaudhuri et al. |
| 6,366,680 B1 | 4/2002 | Brunk et al. |
| 6,430,312 B1 | 8/2002 | Huang et al. |
| 6,556,710 B2 | 4/2003 | Pass et al. |

(Continued)

FOREIGN PATENT DOCUMENTS

| | | |
|---|---|---|
| EP | 1873715 | 1/2008 |
| EP | 1873717 | 1/2008 |
| GB | 2349031 | 10/2000 |
| WO | 9967695 | 12/1999 |

OTHER PUBLICATIONS

Nikolaidis et al., "Image and Video Fingerprinting for Digital Rights Management of Multimedia Data," 2006 International Symposium on Intelligent Signal Processing and Communication Systems (ISPACS2006), Tottori, Japan (7 pages).

(Continued)

*Primary Examiner* — Phuoc Tran
(74) *Attorney, Agent, or Firm* — Hanley, Flight & Zimmerman, LLC

(57) ABSTRACT

Methods, apparatus and articles of manufacture for detecting objects in images using color histograms are disclosed. An example method disclosed herein comprises segmenting an image into sets of subregions, different sets having at least one of different subregion sizes or different subregion offsets relative to one another, determining a first comparison metric quantifying comparison of a first subregion with the object based on differences between bin values of a second color histogram corresponding to the object and adjusted bin values of a first color histogram corresponding to the first subregion, determining a second comparison metric quantifying comparison of a second subregion with the object, and comparing the first and second comparison metrics with a threshold to identify at least one of the subregions as being associated with a possible location of the object in the image.

20 Claims, 11 Drawing Sheets

(56) References Cited

U.S. PATENT DOCUMENTS

| | | |
|---|---|---|
| 6,611,622 B1 | 8/2003 | Krumm |
| 6,675,174 B1 | 1/2004 | Bolle et al. |
| 6,708,167 B2 | 3/2004 | Lee et al. |
| 6,721,447 B1 | 4/2004 | Kim et al. |
| 6,724,915 B1 * | 4/2004 | Toklu et al. ............ 382/103 |
| 6,741,655 B1 | 5/2004 | Chang et al. |
| 6,782,125 B2 | 8/2004 | Lee et al. |
| 6,782,127 B1 | 8/2004 | Lee et al. |
| 6,810,145 B2 | 10/2004 | Briand et al. |
| 6,940,545 B1 | 9/2005 | Ray et al. |
| 6,941,321 B2 | 9/2005 | Schuetze et al. |
| 6,944,332 B1 | 9/2005 | Brechner |
| 7,003,518 B2 | 2/2006 | Lee et al. |
| 7,051,271 B1 | 5/2006 | Chiu et al. |
| 7,103,222 B2 | 9/2006 | Peker |
| 7,170,566 B2 | 1/2007 | McGee et al. |
| 7,203,366 B2 | 4/2007 | Miyatake et al. |
| 7,283,668 B2 * | 10/2007 | Moon et al. ............ 382/168 |
| 7,340,096 B2 | 3/2008 | Stauder et al. |
| 7,376,271 B2 | 5/2008 | Lee et al. |
| 7,411,698 B2 | 8/2008 | Gallina |
| 7,756,299 B2 * | 7/2010 | Higaki ............ 382/106 |
| 8,004,576 B2 | 8/2011 | Sharma |
| 2002/0021836 A1 | 2/2002 | Lee et al. |
| 2004/0133927 A1 | 7/2004 | Sternberg et al. |
| 2004/0218837 A1 | 11/2004 | Shiyama |
| 2005/0172312 A1 | 8/2005 | Lienhart et al. |
| 2006/0187358 A1 | 8/2006 | Lienhart et al. |
| 2006/0195860 A1 | 8/2006 | Eldering et al. |
| 2006/0242667 A1 | 10/2006 | Petersen et al. |
| 2006/0248569 A1 | 11/2006 | Lienhart et al. |
| 2008/0059899 A1 | 3/2008 | Gemmell et al. |
| 2008/0068622 A1 | 3/2008 | Deng et al. |
| 2008/0226173 A1 | 9/2008 | Yuan et al. |
| 2009/0125510 A1 | 5/2009 | Graham et al. |
| 2009/0198599 A1 | 8/2009 | Hui et al. |
| 2010/0177234 A1 | 7/2010 | Ogura et al. |
| 2010/0226574 A1 | 9/2010 | Omori |
| 2010/0316290 A1 | 12/2010 | Jia |
| 2011/0221920 A1 | 9/2011 | Gwak |
| 2011/0268320 A1 | 11/2011 | Huang et al. |
| 2013/0148883 A1 | 6/2013 | Lee |
| 2013/0148884 A1 | 6/2013 | Lee |

OTHER PUBLICATIONS

United States Patent and Trademark Office, "Office Action," issued in connection with U.S. Appl. No. 13/324,624 on Feb. 27, 2014, 6 pages.

United States Patent and Trademark Office, "Office Action," issued in connection with U.S. Appl. No. 13/324,692 on Mar. 13, 2014, 6 pages.

* cited by examiner

DETECTING OBJECTS IN IMAGES USING COLOR HISTOGRAMS

FIELD OF THE DISCLOSURE

This disclosure relates generally to detecting objects in images and, more particularly, to detecting objects in images using color histograms.

BACKGROUND

Image processing techniques for detecting objects in images can have many practical applications. For example, image processing techniques that detect a reference object in an image can be used to determine whether an image object representative of a particular product, a particular logo, a particular brand identifier, etc., is present as a product placement in a television broadcast, is present in a print or online advertisement, is present in an image depicting a store's inventory, etc. To be practical, such image processing techniques should be able to detect the reference object at an arbitrary location and with an arbitrary size in the image scene.

DETAILED DESCRIPTION

Figure 1:
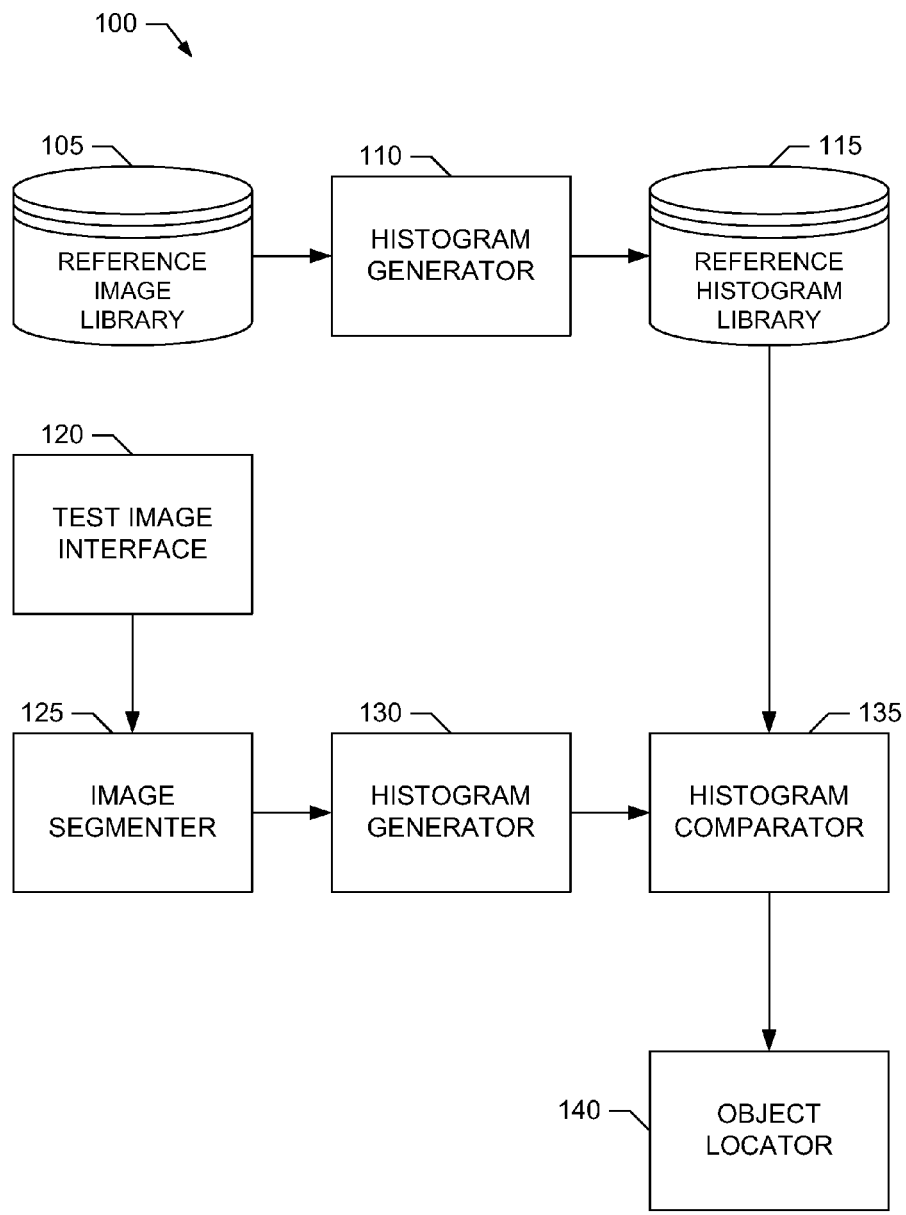
FIG. 1 is a block diagram of an example image object detection system for detecting object in images using color histograms as disclosed herein.

Methods, apparatus and articles of manufacture for detecting objects in images using color histograms are disclosed herein. In general, a color histogram for an image region (e.g., corresponding to an entire image or a subregion of the image) includes a set of bins (also referred to herein as color bins) representing a respective set of possible colors that may be included in the image region. For example, a particular bin corresponding to a particular color (or, in other words, a particular color bin) can have a bin value representing a count of the number of pixels of the image region (or a sampled version/subset of the image region) having that particular color. In some examples, the color histogram for an image region can be stored in a data format that may be used as a signature (e.g., a unique or substantially unique proxy) representative of the image region. In such examples, the color histogram for an image region may be referred to as the image region's color histogram signature.

An example method disclosed herein to detect an image object in an image using color histograms includes segmenting the image (e.g., a test image, also referred to herein as an input image) into sets of image subregions such that different sets have different subregion sizes and/or different subregion offsets relative to one another. The disclosed example method also includes obtaining respective color histograms (also referred to herein as test color histograms) for the image subregions in the sets of image subregions. The disclosed example method additionally includes determining comparison metrics quantifying comparison of respective ones of the image subregions with the image object. For example, a first comparison metric quantifying comparison of a first image subregion with the image object is determined based on differences between bin values of a second color histogram (also referred to herein as a reference color histogram) corresponding to the image object (e.g., the reference object selected or otherwise identified for detection in the image) and adjusted bin values of a first color histogram corresponding to the first image subregion. The disclosed example method further includes comparing the comparison metrics with a threshold to identify the image subregions associated with possible locations of the image object in the image.

As described in detail below, the color histogram corresponding to a respective image subregion of the image can be obtained by quantizing color values of pixels forming the image subregion and including the pixels in color bins of the color histogram representing different possible combinations of the quantized color values. For example, color values for all or a subset (e.g., obtained via uniform vs. random sampling) of the pixels forming the image subregion can be quantized. In some examples, a particular pixel of the subregion is included in a particular one of the color bins based on quantized color values of the pixel and quantized color values of one or more other pixels in a neighborhood of the first pixel.

In some examples, the disclosed example method determines the adjusted bin values of the first color histogram corresponding to the first image subregion of the image (for use in determining the respective first comparison metric) by scaling bin values of the first color histogram by a scale factor (e.g., such as a scale factor of 2 or another value) to determine scaled bin values of the first color histogram. The example method then determines an adjusted bin value of the first color histogram for a particular color bin to be a smaller (e.g., minimum) of a scaled bin value of the first color histogram for the particular color bin or a respective bin value of the second color histogram (corresponding to the image object to be detected) for the particular color bin. In some examples, the method determines the comparison metric by determining the differences between the bin values of the second color histogram and the respective adjusted bin values of the first color histogram, and summing the differences to determine the comparison metric.

In some examples, the disclosed example method identifies a subset of the sets of image subregions having respective comparison metrics that meet (e.g., are less than or equal to) the threshold and depicts the subset of the sets of image subregions in a presentation of the image to, thereby, depict the possible locations of the image object in the image. For example, the method can depict each identified subregion as an outline of the boundaries of the subregion (e.g., such as a square, rectangle, etc.) overlaid on a presentation of the image. Additionally or alternatively, the method can depict an outline of a union (or some other combination) of the identified subset of the sets image subregions overlaid on a presentation of the image. In some examples, the disclosed example method additionally or alternatively combines location information (e.g., such as position, size, shape, etc.) for the image subregions having respective comparison metrics that meet the threshold to estimate a location of the image object in the image.

The image object(s) to be detected in images using color histograms as disclosed herein are not limited to depiction(s) of particular product(s) or other physical object(s). Instead, as used herein, the term "image object" (and similar terms) is intended to be broad and can refer to a physical object, such as a particular product, physical item, etc., but the term can also refer to any other type of image object, element, construct, depiction, etc. For example, an image object can also correspond to a logo, pattern, photo, abstract design, etc., or any other content to be detected in an image. Furthermore, although the following describes examples of detecting objects in images using color histograms, the disclosed example methods, apparatus and articles of manufacture are not limited thereto. For example, the methods, apparatus and articles of manufacture disclosed herein can additionally or alternatively be used to determine whether subregions of an input image match one or more reference images in a reference library (e.g., by replacing terms such as "image object," "reference object" and similar terms with the term "reference image" or similar terms in the descriptions of the example methods, apparatus and articles of manufacture disclosed herein).

As noted above, image processing techniques for detecting objects having arbitrary sizes and/or at arbitrary locations in images can have many practical applications. However, the detection of an object having an arbitrary size and at an arbitrary location in an image scene can be difficult and time consuming using prior image processing techniques, such as those that employ pixel-by-pixel comparisons at each possible location of an object and over all possible object sizes. Prior techniques for detecting objects in images can also be prone to error, such as erroneously detecting a reference object in an image that is not actually present in the image (e.g., a false object detection) or not detecting a reference object in an image that is actually present in the image (e.g., a missed object detection), when the images and/or objects in the images have been distorted. For example, the object to be detected in an image scene may be distorted by noise, image cropping, image reduction in the horizontal and/or vertical dimension(s), rotation, combining with other image elements, etc. Unlike such prior techniques, the detection of objects in images using color histograms as disclosed herein can yield reliable detection of objects at arbitrary locations and/or having arbitrary sizes, even in the presence of such image distortion.

Turning to the figures, a block diagram of an example image object detection system 100 that may be used to detect objects in images using color histograms in accordance with the example methods, apparatus and articles of manufacture disclosed herein is illustrated in FIG. 1. The image object detection system 100 includes an example reference image library 105 that stores a set of one or more reference images depicting image objects (also referred to herein as objects, reference objects, etc.) for detection in a test image (also referred to herein as an input image). The reference image(s) stored in the reference image library 105 can correspond to any type(s) of image(s) obtained from any type(s) of source(s). For example, the reference images stored in the reference image library can include images of products, logo(s), brand identifier(s), etc., or any other type(s) of object(s) captured or otherwise obtained from print media (e.g., magazines, newspapers, etc.), broadcast media (e.g., television programming), photographs of store shelves, online image archives, web searches, etc. The reference image library 105 can correspond to any type or combination of temporary and/or permanent tangible storage media, such as one or more of cache, volatile memory, flash memory, disk storage, etc., including but not limited to one or more of the mass storage devices 1330 and/or volatile memory 1318 in the example processing system 1300 of FIG. 13, which is described in greater detail below.

The image object detection system 100 of the illustrated example also includes an example histogram generator 110 to generate a respective reference color histogram for each reference image included in the set of reference images stored in the reference image library 105. The resulting set of one or more reference color histograms generated by the histogram generator 110 are stored in an example reference histogram library 115 included in the image object detection system 100. For example, a reference color histogram generated by the histogram generator 110 for a particular reference image includes a set of bins (also referred to herein as color bins) representing a respective set of possible colors that may be included in the reference image. For a particular bin corresponding to a particular color (or, in other words, a particular color bin), the histogram generator 110 determines a bin value for the color bin that represents a count of the number of pixels of the particular reference image (or a sampled version/subset of the reference image) having the particular color associated with the color bin. The reference histogram library 115 used to store the set of reference color histograms generated by the histogram generator 110 can correspond to any type or combination of temporary and/or permanent tangible storage media, such as one or more of cache, volatile memory, flash memory, disk storage, etc., including but not limited to one or more of the mass storage devices 1330 and/or volatile memory 1318 in the example processing system 1300 of FIG. 13, which is described in greater detail below. Furthermore, the reference image library 105 and the reference histogram library 115 can be implemented by the same or different storage media.

In the example of FIG. 1, the image object detection system 100 uses the set of reference histograms stored in the reference histogram library 115 to detect reference objects, which are depicted by the set of reference images stored in the reference image library 105, in a test image (also referred to herein as an input image) obtained via an example test image interface 120. For example, the image object detection system 100 determines whether one or more subregions of the test image obtained via the test image interface 120 matches one or more references images stored in the reference image library 105 and, if so, identifies the one or more reference objects associated with the matching references images as being detected in (or possibly detected in) the test image. The test image interface 120 can be implemented by, for example, a camera or other image sensing device to capture an image of a real-world scene (e.g., store shelf, billboard, store window advertisement, etc.), an image of a printed publication placed in the viewing field of the camera/imaging device, an image of a display of a multimedia presentation device (e.g., a television, computer monitor, smartphone, etc.) in the viewing field of the camera/imaging device, etc. Additionally or alternatively, the test image interface 120 can be implemented by a scanner to scan printed images for comparison with the set of reference images in the reference image library 105. Additionally or alternatively, the test image interface 120 can be implemented by a framegrabber or other video capturing device to capture frames of video for comparison with the set of reference images in the reference image library 105. Additionally or alternatively, the test image interface 120 can be implemented by a computer or other processing device configured to obtain test images from one or more network sources (e.g., servers) communicatively coupled to the test image interface 120 (e.g., via the Internet and/or one or more other networks).

The image object detection system 100 includes an example image segmenter 125 to support detection of one or more objects at arbitrary location(s) and/or having arbitrary size(s) in a test image obtained via the test image interface 120. The image segmenter 125 of the illustrated example segments the test image into one or more sets of image subregions. Each subregion in the set of image subregions is then compared, using color histograms, with a reference image representative of a reference object to be detected in the test image, as described in greater detail below. In some examples, the image segmenter 125 iteratively (or otherwise) segments the test image into multiple sets of subregions such that different sets of subregions have different subregion sizes and/or different subregion offsets within the test image. For example, in a first iteration, the image segmenter 125 can segment (e.g., divide, partition, etc.) the test image into a first set of image subregions that partition the test image into a grid containing a first number of subregions (e.g., such as a grid of 10×10 rectangular subregions, yielding a total of 100 rectangles rectangular subregions). In a second iteration, the image segmenter 125 can segment the test image into a second set of subregions that partition the test image into a grid containing a second, smaller number of subregions (e.g., such as a grid of 9×9 larger rectangular subregions, yielding a total of 81 rectangles rectangular subregions). In such an example, the image segmenter 125 can continue to iteratively segment the test image into smaller sets of image subregions until the image segmenter 125 determines a last set containing just one image subregion (e.g., one rectangular image subregion) covering the entire image. In some examples, the image segmenter 125 also determines additional sets of subregions that are offset (e.g., by half or some other fraction of a subregion) relative to the other sets of subregions into which the image has been segmented.

Figure 14:
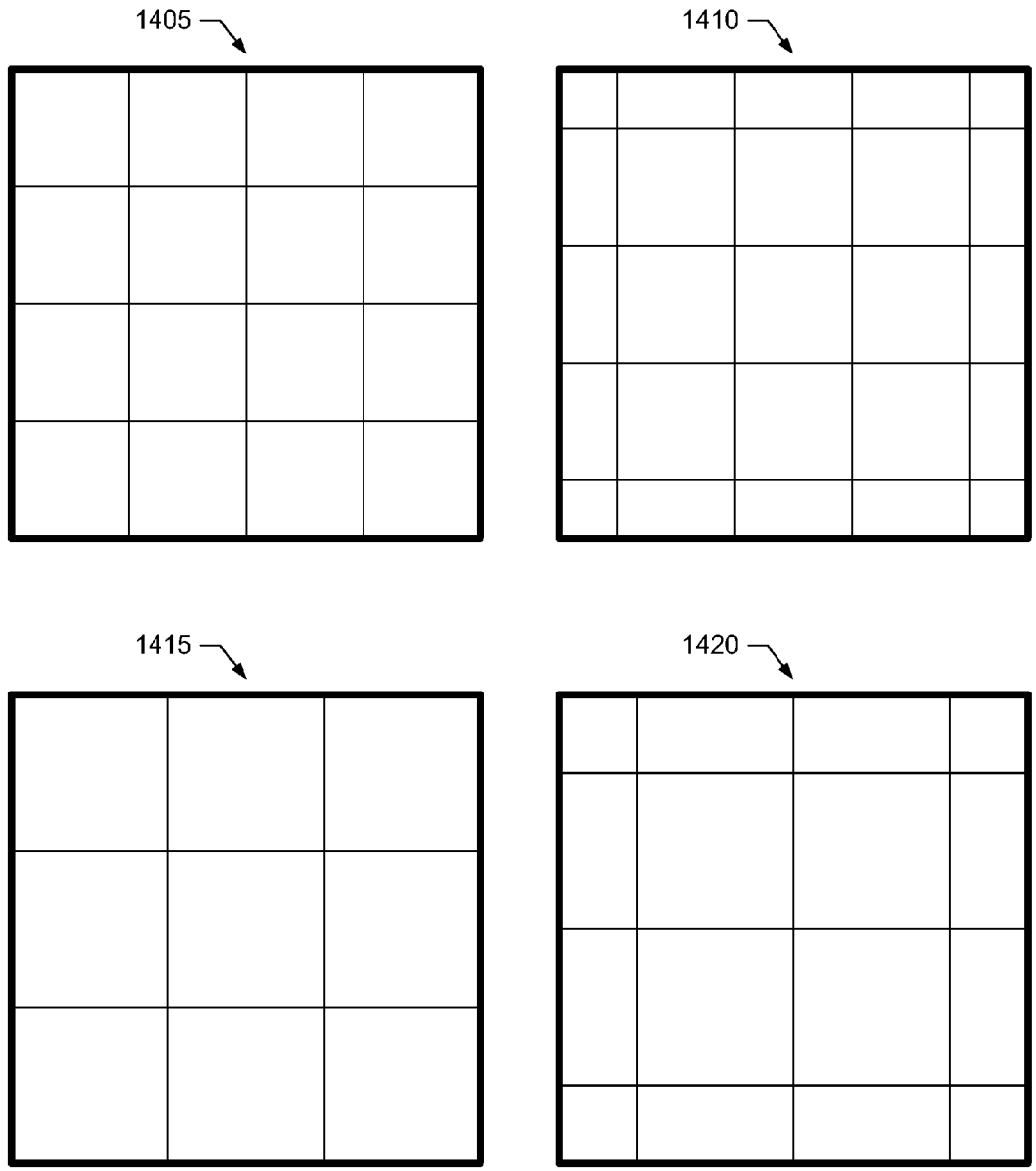
FIG. 14 illustrates example sets of image subregions into which an example image may be segmented by the example image segmenter of FIG. 2.

An example operation of the image segmenter 125 to segment an example test image into example sets of image subregions is illustrated in FIG. 14. In the illustrated example of FIG. 14, image segmenter 125 segments an example test image during a first iteration into a first set of image subregions 1405 that partition the image into a grid of 4×4=16 rectangular (e.g., square) subregions. During a second iteration, the image segmenter 125 segments the example test image into a second set of image subregions 1410 having the same subregion size as the first set of image subregions 1405, but offset in the horizontal and vertical direction from the first set by half the size of the subregion. (In the illustrated example, the image segmenter 125 truncates subregions at the edge of the test image to fit within the test image, but any other appropriate technique for handling subregions at the boundaries of the test image could alternatively be used). During a third iteration, the image segmenter 125 segments the example test image into a third set of image subregions 1415 that partition the image into a grid of 3×3=9 rectangular subregions such that the third set of image subregions 1415 has a larger subregion size (and, thus, a smaller total number of subregions) relative to the first set of image subregions 1405. During a fourth iteration, the image segmenter 125 segments the example test image into a fourth set of image subregions 1420 having the same subregion size as the third set of image subregions 1415, but offset in the horizontal and vertical direction from the third set by half the size of the subregion (where subregions at the edge of the test image are again truncated to fit within the test image). Although the example of FIG. 14 illustrates segmenting a test image into rectangular subregions, the image segmenter 125 can additionally or alternatively segment test image(s) into set(s) of image subregions having different subregion shape(s).

Figure 3:
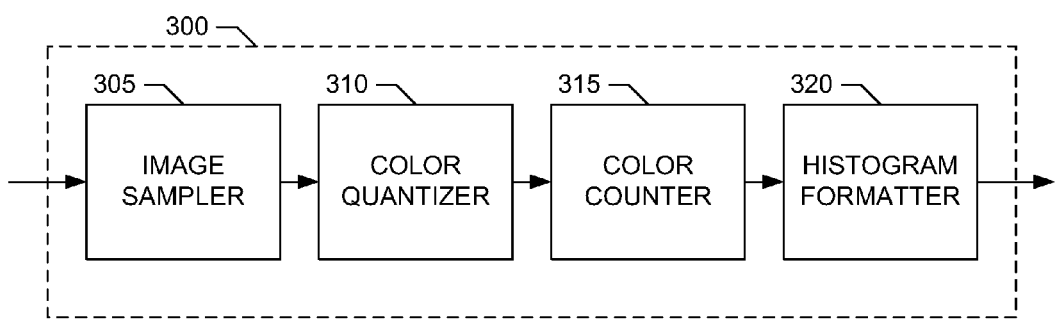
FIG. 3 is a block diagram of an example histogram generator for generating color histograms in the example image object detection system of FIG. 1.

Returning to FIG. 1, the image object detection system 100 of the illustrated example further includes an example histogram generator 130 to generate respective color histograms for the image subregions of the test image as obtained by the image segmenter 125. As such, the color histograms generated by the histogram generator 130 for the test image subregions are also referred to herein as test color histograms. Similar to the reference color histogram(s) generated by the histogram generator 110, a test color histogram generated by the histogram generator 130 for a test image subregion includes a set of bins (e.g., color bins) representing a respective set of possible colors that may be included in the test image subregion. For a particular bin corresponding to a particular color (e.g., for a particular color bin), the histogram generator 130 determines a bin value for the color bin that represents a count of the number of pixels of the test image subregion (or a sampled version/subset of the test image subregion) having the particular color associated with the color bin. In some examples, the histogram generators 110 and 130 may be implemented by the same histogram generator, whereas in other examples, the histogram generators 110 and 130 may be implemented by different histogram generators. An example implementation of the histogram generators 110 and 130 is illustrated in FIG. 3, which is described in greater detail below.

The example image object detection system 100 of FIG. 1 includes an example histogram comparator 135 to compare the respective test color histograms generated by the histogram generator 130 for the test image subregions with a reference color histogram obtained from the reference histogram library 115 for a reference image depicting a reference object that is to be detected in the test image. In the illustrated example, the histogram comparator 135 determines a respective comparison metric that quantifies the results of comparing the reference image for the reference object with a particular test image subregion, resulting in a set of comparison metrics quantifying comparison of the reference image (and, thus, the reference object) with the different subregions included in set(s) of subregions of the test image determined by the image segmenter 125. For example, the histogram comparator 135 determines a comparison metric quantifying comparison of a particular test image subregion with the image object based on differences between bin values of the reference color histogram for the reference image corresponding to the image object and adjusted bin values of the test color histogram corresponding to the particular test image subregion. As described in greater detail below, the histogram comparator 135 determines adjusted bin values of the test color histogram based on comparing scaled bin values of the test color histogram for the particular test image subregion with the bin values of the reference color histogram for the particular reference image. Because the adjusted bin values are determined based on the bin values of the particular reference color histogram, the histogram comparator 135 may determine different test histogram adjusted bin values for a particular test image subregion when comparing the test image to different reference images corresponding to different objects to be detected in the test image.

Adjustment of test color histogram bin values, as described in greater detail below, can permit the image object detection system 100 to determine that a particular test image subregion and a reference image for a reference object substantially match even when the color histograms for the images are different if, for example, the respective bin values of the two color histograms for the color bins are within a scale factor of each other. Such adjustment of the bin values of the test color histogram can improve object detection accuracy and robustness of the image object detection system 100 in the presence of image distortion, such as image corruption by noise, image cropping, image reduction in the horizontal and/or vertical dimension(s), combining of image object(s) in scenes containing other scene elements, etc. In some examples, the scale factor is used to determine the scaled bin values of the test color histogram (from which the adjusted bin values are determined). In such examples, the scale factor can be specified as a variable input parameter to the image object detection system 100 (e.g., to trade-off false matching vs. missed matching results during system operation). Additionally or alternatively, the scale factor can be a configuration parameter that is set during initialization of the image object detection system 100.

The histogram comparator 135 of the illustrated example also processes the set of comparison metrics to determine whether one or more of the test image subregions determined by the image segmenter 125 for the test image obtained via the test image interface 120 match the reference image stored in the reference image library 105 for the reference object being detected. For example, the histogram comparator 135 may determine that a particular test image subregion matches the reference image depicting a particular reference object if the comparison metric associated with comparing the reference image and the particular test image subregion is less than or equal to a threshold. In some examples, the histogram comparator 135 identifies any test image subregion associated with a respective comparison metric that is less than or equal to the threshold as a potential match of the reference image (and, thus, possibly containing the reference image object). In some examples, the threshold can be specified as a variable input parameter to the image object detection system 100 (e.g., to trade-off false detection vs. missed detection results during system operation). Additionally or alternatively, the threshold can be a configuration parameter that is set during initialization of the image object detection system 100.

In the illustrated example of FIG. 1, the image object detection system 100 further includes an example object locator 140 to provide the results of detecting one or more reference objects (depicted by the reference image(s) stored in the reference image library 105) in the test image (obtained via the test image interface 120). For example, the object locator 140 reports or otherwise outputs the image object detection results using any appropriate data format for presentation to a user and/or sending to a receiving device. For example, the object locator 140 can identify each test image subregion that has been determined to match the reference image of the reference object being detected (and, thus, possibly containing the reference object) by overlaying an outline of the boundaries of the subregion (e.g., such as a square, rectangle, etc.) on a presentation of the test image. In some examples, the object locator 140 also reports the comparison metric(s) associated with the matching reference test image subregion (s) within the respective subregion outline(s) overlaid on the presentation of the test image. Additionally or alternatively, in some examples, the object locator 140 can combine location information (e.g., such as position, size, shape, etc.) for the test image subregions that have been determined to match the reference image of the reference object being detected to estimate a location of the reference object in the test image.

Figure 2:
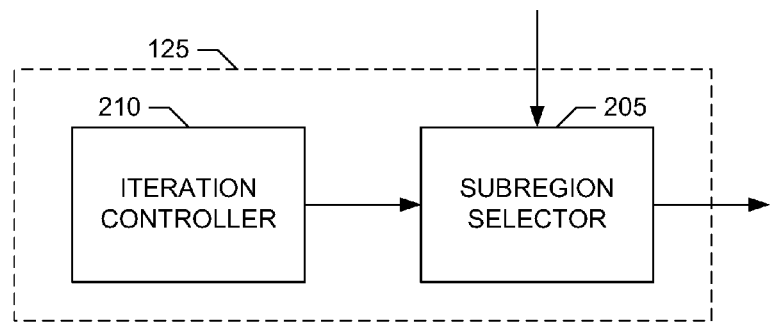
FIG. 2 is a block diagram of an example image segmenter for segmenting images into sets of image subregions in the example image object detection system of FIG. 1.

A block diagram of an example image segmenter 125 that may be used to implement image object detection system 100 of FIG. 1 is illustrated in FIG. 2. The example image segmenter 125 of FIG. 2 includes an example subregion selector 205 to segment an input image (e.g., a test image) into a set of image subregions. In the illustrated example, the subregion selector 205 accepts segmentation configuration parameters from an example iteration controller 210 that specify the subregion size, shape, offset, etc., for use by the subregion selector 205 when segmenting the input image. During different processing iterations, the iteration controller 210 can vary the segmentation configuration parameters to vary the subregion size, shape and/or offset, etc., among different sets of image subregions determined by the subregion selector 205 during different processing iterations.

A block diagram of an example histogram generator 300 that may be used to implement either or both of the histogram generators 110 and/or 130 of FIG. 1 is illustrated in FIG. 3. The histogram generator 300 of the illustrated example includes an example image sampler 305 to sample an input image (e.g., such as a reference image for a reference object or a particular test image subregion determined for a test image, as described above) to determine a set of pixels of the image. For example, the image sampler 305 can sample a subset or all of the pixels of the image to obtain the set of pixels from which the image's color histogram is to be determined. In some examples, the image sampler 305 employs uniform sampling to sample a number of pixels (e.g., such as 1000 or some other number) that are uniformly-spaced in the input image (e.g., and that form a uniformly spaced grid of pixels in the image) to obtain the sampled set of pixels of the image. In other examples, the image sampler 305 employs random sampling to randomly sample a number of pixels (e.g., such as 1000 or some other number) in the input image to obtain the sampled set of pixels of the image. In some examples, the image sampler 305 can be omitted and all of the pixels of the image are included in the set of pixels processed by the histogram generator 300 to determine the image's color histogram.

The histogram generator 300 of FIG. 3 also includes an example color quantizer 310 to quantize the color values of the pixels in the set of pixels of the input image. Each pixel of the image is associated with a set of color values, such as three color values corresponding to a red color value, a green color value and a blue color value. In the illustrated example, the color quantizer 310 quantizes each color value of a pixel into a set of levels. For example, the color quantizer 310 may use any appropriate quantization technique to quantize the red color value of each pixel into R intensity levels, the green color value of each pixel into G intensity levels, and the blue color value of each pixel into B intensity levels. The values of R, G and B can be the same or different, and may be variable input parameters and/or initial configuration parameters of the histogram generator 300.

In some examples, the number of levels into which the color quantizer 310 quantizes each color value determines the resulting number of possible color combinations that can be represented by the quantized pixels, which corresponds to the number of color bins of the color histogram determined by the histogram generator 300. In other words, the aforementioned quantization of the red, green and blue color values yields R×G×B color combinations and, thus, the color histogram determined by the histogram generator 300 of the illustrated example has R×G×B color bins. For example, if R=G=B=8, then the total number of possible color combinations and, thus, the total number of color bins is 8×8×8=512. Color quantization as performed by the color quantizer 310 can reduce processing requirements and improve image matching robustness, such as in circumstances in which small color variations between images occur due to, for example, image smoothing and/or other processing of the test and/or reference images.

In other examples, the quantized color values of a particular pixel are combined (e.g., concatenated) with the quantized color values of one or more other pixels in a neighborhood of the particular pixel to determine the quantized color combination for the particular pixel. The value of the quantized color combination for the particular pixel (e.g., the value obtained by combining the quantized color values of the particular pixel with those of the neighboring pixel(s)) then determines the histogram color bin in which the pixel is to be included. Like before, the resulting number of possible color combinations that can be represented by the combination of quantized pixels in a neighborhood corresponds to the number of color bins of the color histogram determined by the histogram generator 300. In other words, if the quantized color values of a particular pixel are combined with the quantized color values of N−1 neighboring pixels, then the number of possible color combinations associated with combining the neighboring quantized pixels and, thus, the number if color histogram bins is $(R \times G \times B)^N$. For example, if R=G=B=2 (corresponding to binary, or 1 bit, quantization) and the quantized color values of a particular pixel are combined with the quantized color values of a first neighbor pixel located a first number (e.g., 5 or some other number) of pixels up from the particular pixel and a second neighbor pixel located a second number (e.g., 5 or some other number) of pixels to the left of the particular pixel, then the total number of possible color combinations for the combination of a pixel with its N−1 neighboring pixels and, thus, the total number of color bins is $(2 \times 2 \times 2)^3 = 512$.

In the illustrated example, the histogram generator 300 includes an example color counter 315 to count the numbers of times each possible quantized color combination appears in the sampled set of pixels of the input image. For example, the color counter 315 can store each possible color combination that can be exhibited by the quantized pixels as a respective element of a data array (e.g., with the integer value of a particular color combination forming the index for its respective element in the data array). In such an example, the color counter 315 increments the values of the array elements to count the numbers of times each different color combination appears in the quantized set of pixels. The resulting counts of the different color combinations appearing in the quantized set of pixels of the input image forms the color histogram of the input image.

An example histogram formatter 320 is included in the histogram generator 300 to format the color histogram determined by the image sampler 305, the color quantizer 310 and the color counter 315 for subsequent processing. For example, the histogram formatter 320 may output a data array in which each element is indexed by a respective possible color combination and in which the element values correspond to the counts of the different color combinations appearing in the image. In some examples, the histogram formatter 320 may format the data array into a numeric value that may be used as a signature or, in other words, a color histogram signature, of the input image. For example, the histogram formatter 320 may concatenate the bin values of the data array representing the image's color histogram into a numeric value (e.g., such as a binary value) forming the color histogram signature of the input image.

Figure 4:
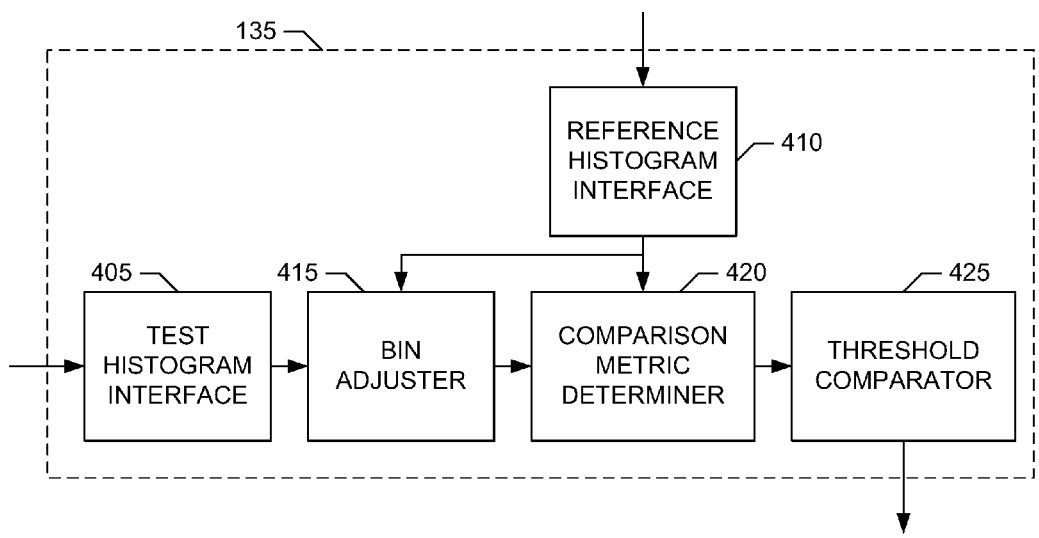
FIG. 4 is a block diagram of an example histogram comparator for comparing color histograms in the example image object detection system of FIG. 1.

A block diagram of an example implementation of the histogram comparator 135 of FIG. 1 is illustrated in FIG. 4. The histogram comparator 135 of FIG. 4 includes an example test histogram interface 405 to obtain a color histogram of a test image subregion (also referred to herein as the test color histogram) that is to be compared with a color histogram of a reference image (also referred to herein as the reference color histogram) obtained via an example reference histogram interface 410 for a reference object to be detected in the test image subregion. For example, the histogram interface 405 may receive the test color histogram from the histogram generator 130, and the reference histogram interface 410 may receive the reference color histogram from the histogram generator 110 and/or the reference histogram library 115. The histogram interface 405 and the reference histogram interface 410 can be implemented by any type(s) of data interface(s), communication bus(ses), function(s), module(s), etc., capable of receiving the color histograms and/or color histogram signatures from the histogram generators 110, 130 and/or 300.

The example histogram comparator 135 of FIG. 4 also includes an example bin adjuster 415 to determine adjusted bin values of the test color histogram that are based on the bin values of the reference color histogram and a scale factor. In the illustrated example, the bin adjuster 415 determines the adjusted bin values of the test color histogram by scaling bin values of the test color histogram by a scale factor (e.g., such as a scale factor of 2 or another value) to determine scaled bin values of the test color histogram. As noted above, the scale factor can be a variable input parameter, a configuration parameter set during initialization, etc. Using the scaled bin values, the bin adjuster 415 compares the scaled bin values of the test color histogram to the respective bin values of the reference color histogram to determine the adjusted bin values of the test color histogram.

For example, the bin adjuster 415 can determine an adjusted bin value of the test color histogram to be the smaller of the respective scaled bin value of the test color histogram or the respective bin value of the reference color histogram. Mathematically, such an adjusted bin value for a particular color combination C in the test color histogram can be determined using Equation 1, which is:

$$\text{AdjustedHistogramTestImage}[C] = \min\{K \times \text{HistogramTestImage}[C], \text{HistogramRefImage}[C]\}. \quad \text{Equation 1}$$

Figure 5:
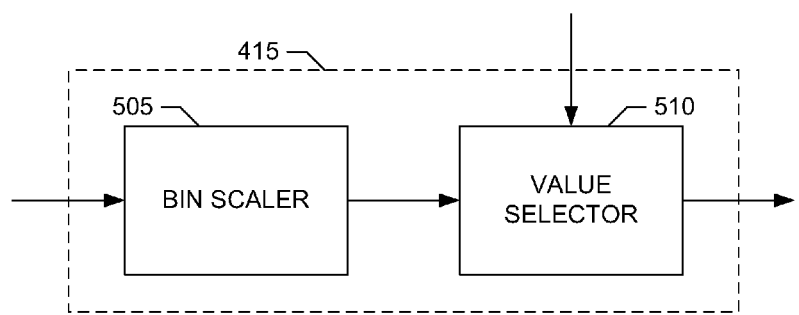
FIG. 5 is a block diagram of an example bin adjuster that may be used to implement the example histogram comparator of FIG. 4.

In Equation 1, HistogramTestImage[C] corresponds to the bin value for the color combination C in the test color histogram, HistogramRefImage[C] corresponds to the bin value for the color combination C in the reference color histogram, K is the scale factor used to scale the bin values of the test color histogram to determine the scaled bin values, min{ } is a function that selects a minimum value from a set of input values, and AdjustedHistogramTestImage[C] is the resulting adjusted bin value for the color combination C in the test color histogram. An example implementation of the bin adjuster 415 is illustrated in FIG. 5, which is described in greater detail below.

The illustrated example histogram comparator 135 of FIG. 4 further includes an example comparison metric determiner 420 to determine a comparison metric based on differences between bin values of the reference color histogram and the adjusted bin values of the test color histogram. In some examples, the metric determiner 420 determines the comparison metrics by determining the differences between the bin values of the reference color histogram and the respective adjusted bin values of the test color histogram for the same color combinations and summing the differences to determine the comparison metric. In such examples, the difference between the bin value for the color combination C in the reference color histogram and the respective adjusted bin value for the color combination C in the test color histogram can be represented mathematically as the quantity Difference[C] and determined using Equation 2, which is:

$$\text{Difference}[C] = \text{HistogramRefImage}[C] - \min\{K \times \text{HistogramTestImage}[C], \text{HistogramRefImage}[C]\}. \quad \text{Equation 2}$$

Using Equation 2, the comparison metric can be represented mathematically as the quantity ComparisonMetric and determined mathematically by summing the differences between the bin values of the reference color histogram and the respective adjusted bin values of the test color histogram in accordance with Equation 3, which is:

$$\text{ComparisonMetric} = \quad \text{Equation 3}$$
$$\text{sum}_C\{\text{Difference}[C]\} = \text{sum}_C\{\text{HistogramRefImage}[C] -$$
$$\min\{K \times \text{HistogramTestImage}[C],$$
$$\text{HistogramRefImage}[C]\}\}.$$

Figure 6:
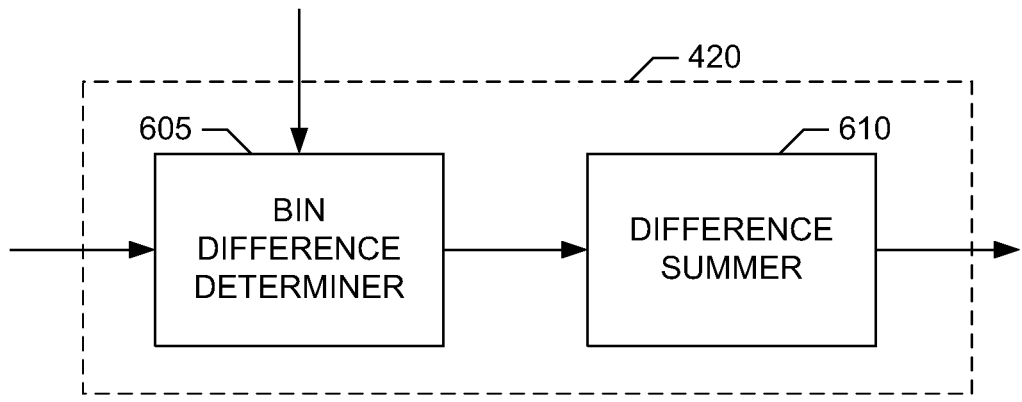
FIG. 6 is a block diagram of an example comparison metric determiner that may be used to implement the example histogram comparator of FIG. 4.

In Equation 3, $\text{sum}_C\{\ \}$ denotes the sum over the set of possible color combinations {C} represented by the test and reference color histograms. An example implementation of the comparison metric determiner 420 is illustrated in FIG. 6, which is described in greater detail below.

In some examples, the bin adjuster 415 and the comparison metric determiner 420 determine a set of comparison metrics corresponding respectively to comparing test color histograms for subregions in the sets of image subregions determined for a test image with a reference color histogram associated with a reference image for a reference object to be detected in the test image.

An example threshold comparator 425 is included in the example histogram comparator 135 of FIG. 4 to compare the comparison metric(s) obtained from the comparison metric determiner 420 to a threshold to determine whether the test image subregion(s) associated with the comparison metric(s) match the reference image (e.g. and, thus, contain or possibly contain the reference object being detected in the test image). As noted above, the threshold can be a variable input parameter, a configuration parameter set during initialization, etc. In some examples, the threshold comparator 425 indicates that a particular test image subregion associated with a respective comparison metric is a match to the reference image for the reference object if the comparison metric is less than or equal to the threshold. Otherwise, if the comparison metric is greater than the threshold, the threshold comparator 425 indicates that this particular test image subregion is not a match to the reference image. In examples in which the comparison metric determiner 420 provides multiple comparison metrics, the threshold comparator 425 identifies test image subregion(s) associated with respective comparison metric(s) that is(are) less than or equal to the threshold as potential match(es) of the reference image (and, thus, subregions that contain or possibly contain the reference object being detected).

A block diagram of an example implementation of the bin adjuster 415 of FIG. 4 is illustrated in FIG. 5. The example bin adjuster 415 of FIG. 5 includes an example bin scaler 505 and an example value selector 510. In the illustrated example, the bin scaler 505 determines the scaled bin values of the test color histogram by scaling the test color histogram's bin values by the scale factor, as described above. For example, the bin scaler 505 can determine the adjusted bin value for a particular color combination C in the test color histogram to be K×HistogramTestImage[C], where HistogramTestImage[C] corresponds to the bin value for the color combination C in the test color histogram, and K is the scale factor used to scale the bin values of the test color histogram to determine the scaled bin values.

The value selector 510 of the illustrated example determines the adjusted bin values of the test color histogram to be the smaller of the scaled bin values of the test color histogram as determined by the bin scaler 505 or the respective bin values of the reference color histogram, as described above. For example, the value selector 510 can use Equation 1, which is described above, to select the adjusted bin value, AdjustedHistogramTestImage[C], for the color combination C in the test color histogram to be the minimum of either the scaled bin value, K×HistogramTestImage[C], for this color combination C in the test color histogram or the respective bin value, HistogramRefImage[C], for this color combination C in the reference color histogram.

A block diagram of an example implementation of the comparison metric determiner 420 of FIG. 4 is illustrated in FIG. 6. The example comparison metric determiner 420 of FIG. 6 includes an example bin difference determiner 605 and an example difference summer 610. In the illustrated example, the bin difference determiner 605 determines the differences between bin values of the reference color histogram and respective adjusted bin values of the test color histogram for the same color combinations. For example, the bin difference determiner 605 can use Equation 2, which is described above, to determine, for each color combination C, the respective difference, Difference[C], between the bin value for the color combination C in the reference color histogram and the respective adjusted bin value for the color combination C in the test color histogram.

The difference summer 610 of the illustrated example determines the sum of the differences obtained from the bin difference determiner 605. For example, the difference summer 610 can use Equation 3, which is described above, to determine the sum, $sum_C\{\ \}$, of the differences, Difference [C], over the set of possible color combinations $\{C\}$. In the illustrated example, this sum forms the comparison metric that quantifies the result of comparing the test image and respective reference image, as described above.

Figure 7:
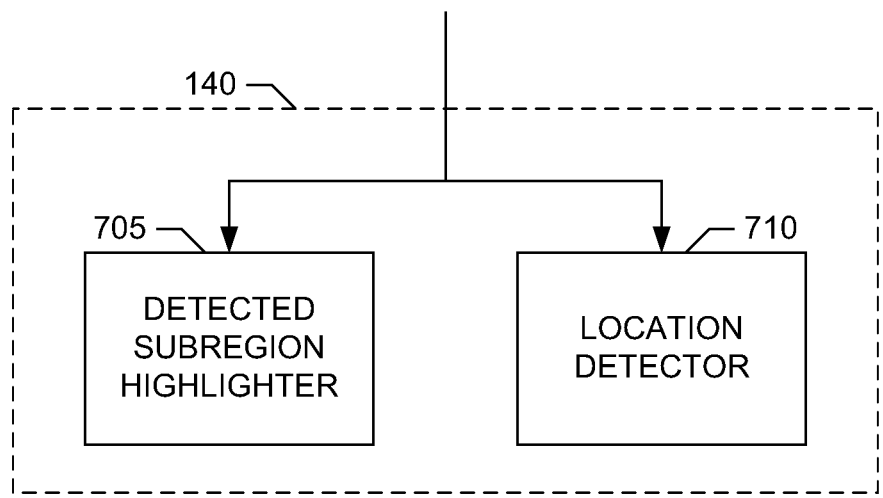
FIG. 7 is a block diagram of an example object locator for reporting detection results in the example image object detection system of FIG. 1.

A block diagram of an example implementation of the object identifier 140 of FIG. 1 is illustrated in FIG. 7. The example object identifier 140 of FIG. 7 includes an example detected subregion highlighter 705 to identify test image subregion(s) that have been determined to match the reference image of the reference object being detected (and, thus, possibly contain the reference object). In examples in which the test image (for which object detection is being performed) is segmented into sets of image subregions, the detected subregion highlighter 705 receives a subset of the sets of image subregions for which the comparison metrics quantifying comparison of the subset of image subregions with the reference image meet (e.g., are less than or equal to) the detection threshold described above. In such examples, the detected subregion highlighter 705 identifies this subset of image subregions by overlaying an outline of the boundaries of the subregions (e.g., such as squares, rectangles, etc.) on a presentation of the test image. In some examples, the detected subregion highlighter 705 additionally or alternatively depicts an outline of a union (or some other combination) of this subset of the sets image subregions overlaid on the presentation of the test image.

The example object identifier 140 of FIG. 7 also includes an example location detector 710 to estimate a location of the reference object in the test image. In examples in which the test image (for which object detection is being performed) is segmented into sets of image subregions, the location detector 710 receives a subset of the sets of image subregions for which the comparison metrics quantifying comparison of the subset of image subregions with the reference image meet (e.g., are less than or equal to) the detection threshold described above. In such examples, the location detector 710 combines location information (e.g., such as position, size, shape, etc.) for image subregions in this subset to estimate a location of the reference object in the image. For example, the location detector 710 can estimate the location of the reference object in the image to be an average (possibly weighted based on the comparison metrics) of the centroids of the subregions whose comparison metrics are less than or equal to the detection threshold described above.

While example manners of implementing the image object detection system 100 have been illustrated in FIGS. 1-7, one or more of the elements, processes and/or devices illustrated in FIGS. 1-7 may be combined, divided, re-arranged, omitted, eliminated and/or implemented in any other way. Further, the example histogram generators 110, 130 and/or 300, the example test interface 120, the example image segmenter 125, the example histogram comparator 135, the example object locator 140, the example subregion selector 205, the example iteration controller 210, the example image sampler 305, the example color quantizer 310, the example color counter 315, the example histogram formatter 320, the example test histogram interface 405, the example reference histogram interface 410, the example bin adjuster 415, the example comparison metric determiner 420, the example threshold comparator 425, the example bin scaler 505, the example value selector 510, the example bin difference determiner 605, the example difference summer 610, the example detected subregion highlighter 705, the example location detector 710 and/or, more generally, the example image object detection system 100 of FIGS. 1-7 may be implemented by hardware, software, firmware and/or any combination of hardware, software and/or firmware. Thus, for example, any of the example histogram generators 110, 130 and/or 300, the example test interface 120, the example image segmenter 125, the example histogram comparator 135, the example object locator 140, the example subregion selector 205, the example iteration controller 210, the example image sampler 305, the example color quantizer 310, the example color counter 315, the example histogram formatter 320, the example test histogram interface 405, the example reference histogram interface 410, the example bin adjuster 415, the example comparison metric determiner 420, the example threshold comparator 425, the example bin scaler 505, the example value selector 510, the example bin difference determiner 605, the example difference summer 610, the example detected subregion highlighter 705, the example location detector 710 and/or, more generally, the example image object detection system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example image object detection system 100, the example histogram generators 110, 130 and/or 300, the example test interface 120, the example image segmenter 125, the example histogram comparator 135, the example object locator 140, the example subregion selector 205, the example iteration controller 210, the example image sampler 305, the example color quantizer 310, the example color counter 315, the example histogram formatter 320, the example test histogram interface 405, the example reference histogram interface 410, the example bin adjuster 415, the example comparison metric determiner 420, the example threshold comparator 425, the example bin scaler 505, the example value selector 510, the example bin difference determiner 605, the example difference summer 610, the example detected subregion highlighter 705 and/or the example location detector 710 are hereby expressly defined to include a tangible computer readable medium such as a memory, digital versatile disk (DVD), compact disk (CD), Blu-ray Disc™, etc., storing such software and/or firmware. Further still, the example image object detection system 100 as illustrated in FIGS. 1-7 may include one or more elements, processes and/or devices in addition to, or instead of, those illustrated in FIGS. 1-7, and/or may include more than one of any or all of the illustrated elements, processes and devices.

Flowcharts representative of example machine readable instructions for implementing the example image object detection system 100, the example histogram generators 110, 130 and/or 300, the example test interface 120, the example image segmenter 125, the example histogram comparator 135, the example object locator 140, the example subregion selector 205, the example iteration controller 210, the example image sampler 305, the example color quantizer 310, the example color counter 315, the example histogram formatter 320, the example test histogram interface 405, the example reference histogram interface 410, the example bin adjuster 415, the example comparison metric determiner 420, the example threshold comparator 425, the example bin scaler 505, the example value selector 510, the example bin difference determiner 605, the example difference summer 610, the example detected subregion highlighter 705 and/or the example location detector 710 are shown in FIGS. 8-12. In these examples, the machine readable instructions represented by each flowchart may comprise one or more programs for execution by a processor, such as the processor 1312 shown in the example processing system 1300 discussed below in connection with FIG. 13. The one or more programs, or portion(s) thereof, may be embodied in software stored on a tangible computer readable storage medium such as a CD-ROM, a floppy disk, a hard drive, a digital versatile disk (DVD), a Blu-ray Disc™, or a memory associated with the processor 1312, but the entire program or programs and/or portions thereof could alternatively be executed by a device other than the processor 1312 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 8-12 may be implemented manually. Further, although the example machine readable instructions are described with reference to the flowcharts illustrated in FIGS. 8-12, many other methods of implementing the example image object detection system 100, the example histogram generators 110, 130 and/or 300, the example test interface 120, the example image segmenter 125, the example histogram comparator 135, the example object locator 140, the example subregion selector 205, the example iteration controller 210, the example image sampler 305, the example color quantizer 310, the example color counter 315, the example histogram formatter 320, the example test histogram interface 405, the example reference histogram interface 410, the example bin adjuster 415, the example comparison metric determiner 420, the example threshold comparator 425, the example bin scaler 505, the example value selector 510, the example bin difference determiner 605, the example difference summer 610, the example detected subregion highlighter 705 and/or the example location detector 710 may alternatively be used. For example, with reference to the flowcharts illustrated in FIGS. 8-12, the order of execution of the blocks may be changed, and/or some of the blocks described may be changed, eliminated, combined and/or subdivided into multiple blocks.

As mentioned above, the example processes of FIGS. 8-12 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). The tangible computer readable medium can be local to and/or remote from the processor(s), device(s), apparatus, etc., that is/are to execute the coded instructions. As used herein, the term tangible computer readable medium is expressly defined to include any type of computer readable storage and to exclude propagating signals. Additionally or alternatively, the example processes of FIGS. 8-12 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 8:
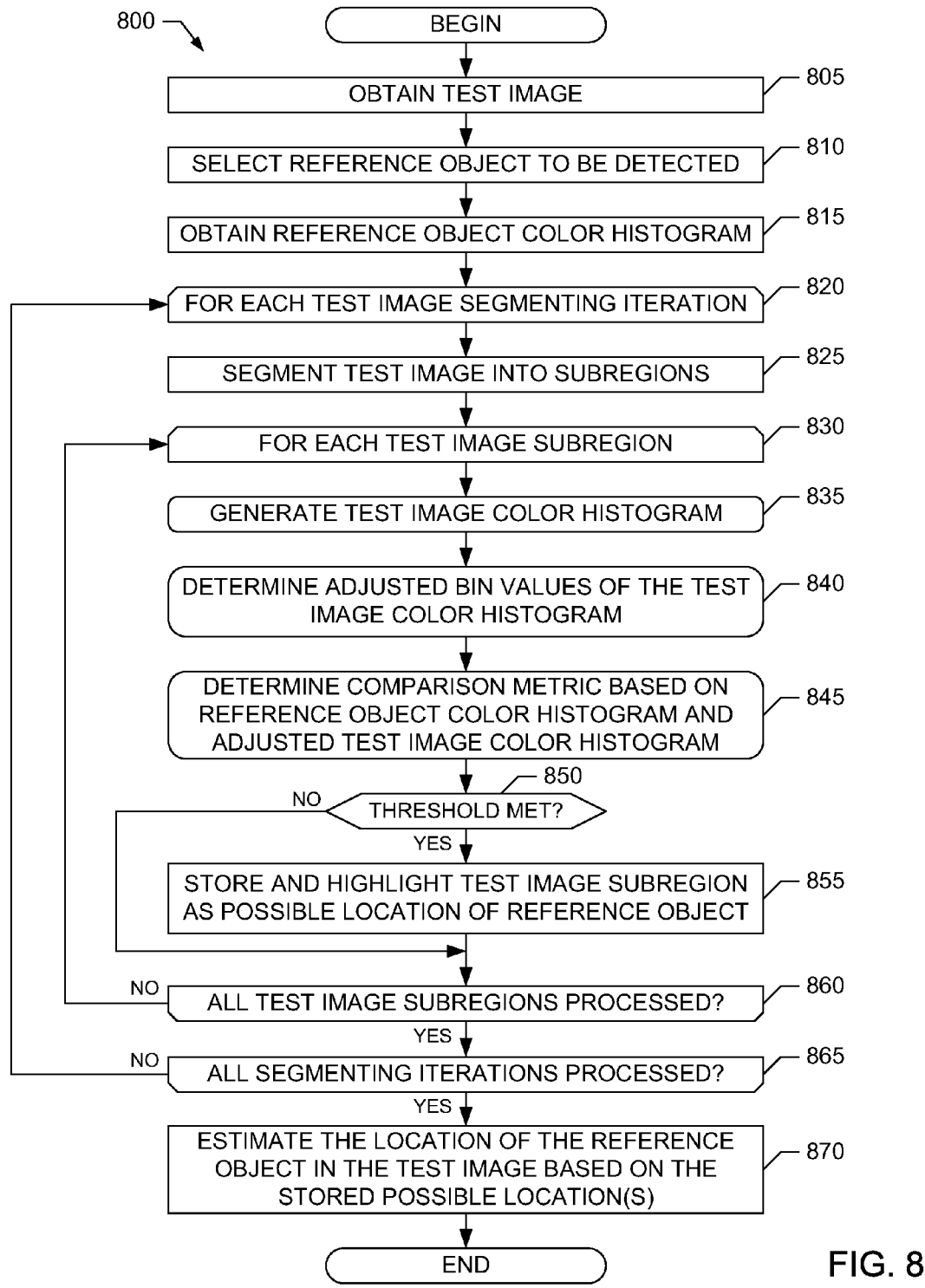
FIG. 8 is a flowchart representative of example machine readable instructions that may be executed to implement the example image object detection system of FIG. 1.

Example machine readable instructions 800 that may be executed to implement the example image object detection system 100 of FIG. 1 are represented by the flowchart shown in FIG. 8. The example machine readable instructions 800 may be executed, for example, when one or more reference objects are to be detected in a test image. With reference to the preceding figures, the machine readable instructions 800 of FIG. 8 begin execution at block 805 at which the test image interface 120 of the image object detection system 100 obtains, as described above, a test (e.g., input) image for comparison with one or more of the reference images stored in the reference image library 105 and that depict reference image objects of interest. At block 810, a reference object depicted by a reference image stored in the reference image library 105 is selected for detection in the test image obtained at block 805. At block 815, the histogram comparator 135 of the image object detection system 100 accesses the reference histogram library 115 of the image object detection system 100 to obtain the reference color histogram for the reference image depicting the reference object selected at block 810. As described above, the histogram generator 110 of the image object detection system 100 can be used to generate a respective set of reference color histograms for the set of reference object images stored in the reference image library 105

Figure 9:
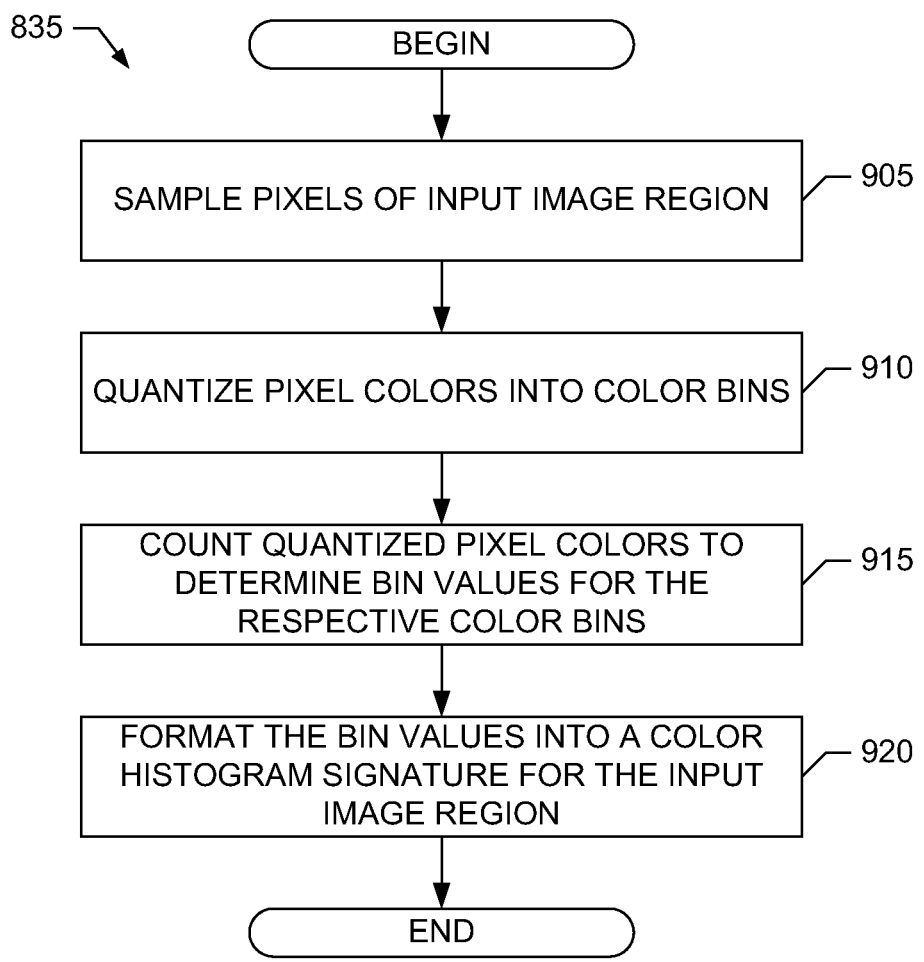
FIG. 9 is a flowchart representative of example machine readable instructions that may be executed to implement the example histogram generator of FIG. 3, and/or used to implement portions of the example machine readable instructions of FIG. 8.

At block 820, the image object detection system 100 begins iterative color histogram comparison processing to detect the reference object selected at block 810 in the test image obtained at block 805. For example, at block 825 the image segmenter 125 of the image object detection system 100 segments the test image into a set of image subregions. In the illustrated example, and as described above, the image segmenter 125 segments the test image into different sets of image subregions having different subregion sizes, offsets, shapes, etc., during different processing iterations of the example machine readable instructions 800. At block 830, the image object detection system 100 begins color histogram comparison processing for each subregion in a set of subregions to detect whether the reference object selected at block 810 is contained or otherwise present in the subregion. For example, at block 835, the histogram generator 130 of the image object detection system 100 determines a test color histogram, as described above, for a particular test image subregion included in the set of image subregions determined by the image segmenter 125 at block 825. Example machine readable instructions that may be used to implement the processing at block 835 are illustrated in FIG. 9, which is described in greater detail below.

Figure 10:
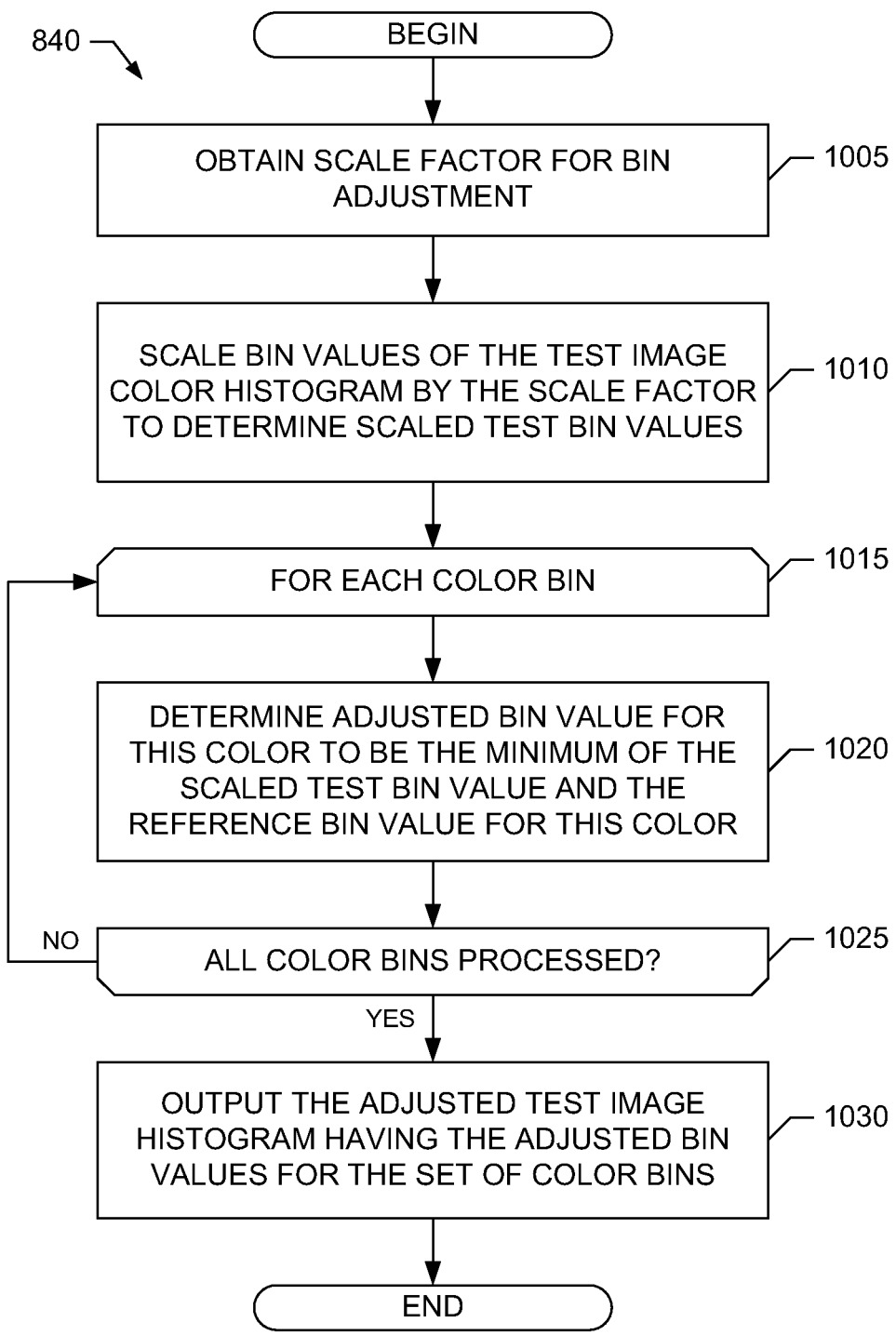
FIG. 10 is a flowchart representative of example machine readable instructions that may be executed to implement the example bin adjuster of FIG. 5 in the example histogram comparator of FIG. 4, and/or used to implement portions of the example machine readable instructions of FIG. 8.

At block 840, the histogram comparator 135 of the image object detection system 100 determines adjusted bin values of the test color histogram generated at block 810 for the test image subregion. For example, at block 840, the bin adjuster 415 of the histogram comparator 135 uses the bin values of the reference color histogram obtained at block 815 and a scale factor, as described above, to determine the adjusted bin values of the test color histogram. Example machine readable instructions that may be used to implement the processing at block 840 are illustrated in FIG. 10, which is described in greater detail below.

Figure 11:
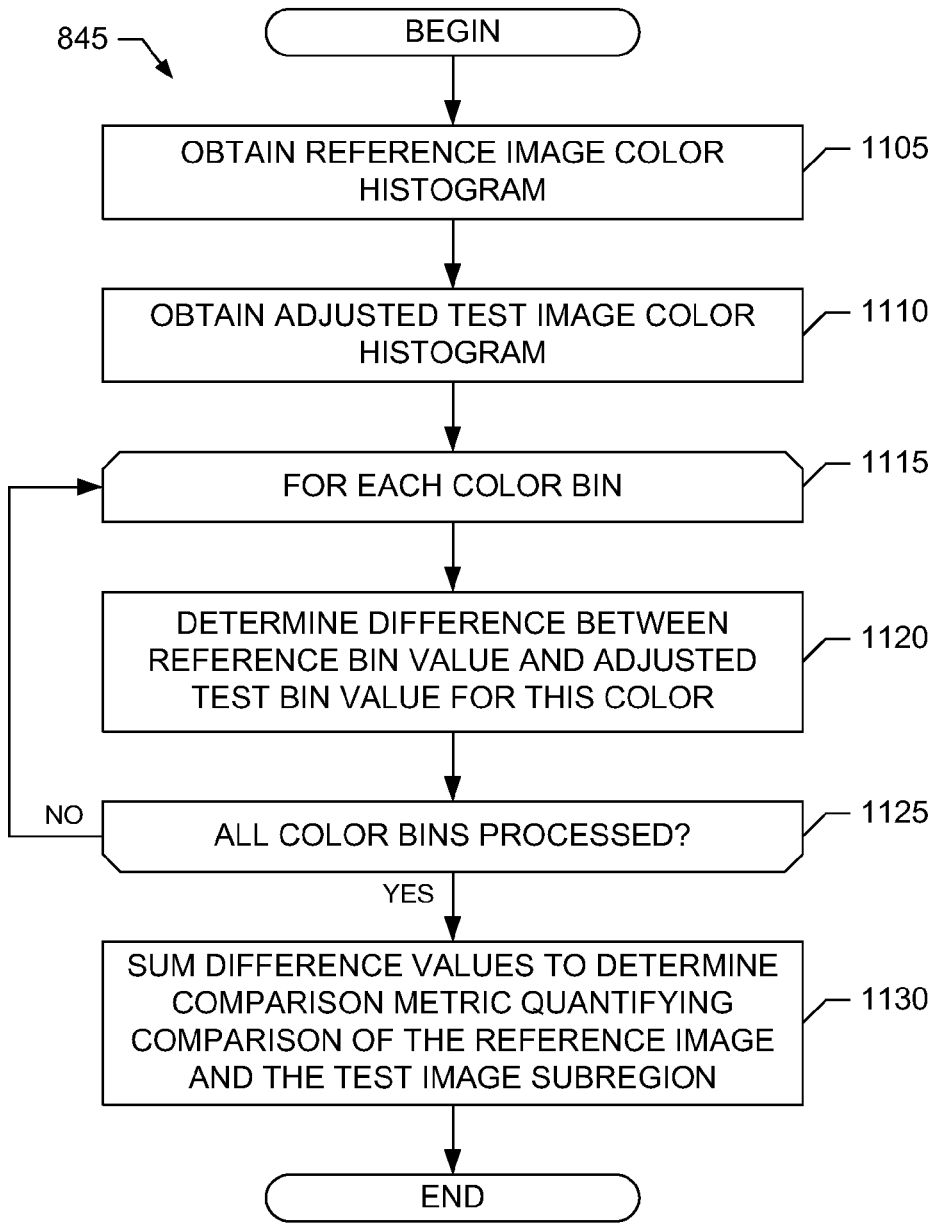
FIG. 11 is a flowchart representative of example machine readable instructions that may be executed to implement the example comparison metric determiner of FIG. 6 in the example histogram comparator of FIG. 4, and/or used to implement portions of the example machine readable instructions of FIG. 8.

At block 845, the histogram comparator 135 determines, based on the bin values of the reference color histogram obtained at block 815 and the adjusted bin values of the test color histogram determined at block 840, a comparison metric that quantifies the results of comparing the reference image depicting the reference object with the particular test image subregion being processed. For example, at block 845, the comparison metric determiner 420 of the histogram comparator 135 can determine the comparison metric by summing the differences between bin values of the reference color histogram and respective adjusted bin values of the test color histogram, as described above. Example machine readable instructions that may be used to implement the processing at block 845 are illustrated in FIG. 11, which is described in greater detail below.

At block 850, the histogram comparator 135 determines whether the comparison metric determined at block 845 to quantify the results of comparing a particular test image subregion with the reference object image meets a detection threshold. For example, the histogram comparator 135 compares the comparison metric to the detection threshold to detect whether the particular test image subregion corresponds to (e.g., contains, includes, is a part of, etc.) the reference object selected for detection at block 810. If the comparison metric meets (e.g., is less than or equal to) the detection threshold (block 850), at block 855 the object locator 140 of the image object detection system 100 stores location information for the particular test image subregion as a possible location of the reference object. Additionally, at block 855, the detected subregion highlighter 705 of the object locator 140 highlights the particular test image subregion in the test image (e.g., to indicate that it is a possible location of the reference object) by overlaying an outline of the boundaries of the subregion (e.g., such as a square, rectangle, etc.) on a presentation of the test image, as described above.

In the illustrated example, the processing at blocks 835-855 is repeated for each image subregion in a particular set of image subregions of the test image determined at block 825. After the image subregions in a particular set have been processed (block 860), the processing at blocks 825-855 is repeated for each iteration of segmenting the test image into different sets of image subregions having different subregion sizes, offsets, shapes, etc. After iteration over the different sets of test image subregions is complete (block 865), the location detector 710 of the object identifier 140 estimates, as described above, a location of the reference object in the test image by combining the location information (e.g., such as position, size, shape, etc.) stored at block 855 for image subregions whose comparison metrics met the detection threshold. Execution of the example machine readable instructions 800 then ends.

Example machine readable instructions 835 that may be used to implement one or more of the histogram generators 110, 130 and/or 300, and/or to perform the processing at block 835 of FIG. 8, are illustrated in FIG. 9. For brevity, execution of the machine readable instructions 835 of FIG. 9 is described from the perspective of implementation by the histogram generator 300. However, the machine readable instructions 835 of FIG. 9 could additionally or alternatively be executed by the histogram generators 110 and/or 130.

With reference to the preceding figures, execution of the machine readable instructions 835 of FIG. 9 begins at block 905 at which the image sampler 305 of the histogram generator 300 samples, as described above, pixels of an input image region to determine a set of pixels for which a color histogram is to be determined. The input image region processed at block 905 can correspond to, for example, a particular test image subregion of a segmented test image, an entire reference image (or portion thereof) depicting a reference object to be detected, etc. At block 910, the color quantizer 310 of the histogram generator 300 quantizes the color values (e.g., three color values, such as red, blue and green) of the sampled pixels into respective sets of color levels, as described above, to yield a total number of possible color combinations and, thus, a total number of color bins represented by the color histogram. In some example, the color quantizer 310 also combines quantized color levels of a particular pixel with one or more neighboring pixels, as described above, to determine the quantized color combination of the particular pixel. At block 915, the color counter 315 of the histogram generator 300 counts the numbers of times each possible quantized color combination appears in the sampled set of pixels to determine the bin values of the color bins of the color histogram. At block 920, the histogram formatter 320 of the histogram generator 300 formats the bin values of the color bins into a color histogram data representation, such as a color histogram signature, for the input image region, which may be stored and/or used in subsequent processing. Execution of the example machine readable instructions 835 then ends.

Example machine readable instructions 840 that may be used to implement the bin adjuster 415 of the histogram comparator 135, and/or to perform the processing at block 840 of FIG. 8, are illustrated in FIG. 10. With reference to the preceding figures, execution of the machine readable instructions 840 of FIG. 10 begins at block 1005 at which the bin adjuster 415 obtains the scale factor described above. At block 1010, the bin adjuster 415 scales the bin values of the test color histogram of the test image subregion by the scale factor obtained at block 1005 to obtain the scaled bin values of the test color histogram. At block 1015, the bin adjuster 415 begins processing to adjust each bin value of the test color histogram. For example, at block 1020, the bin adjuster 415 determines the adjusted bin value for a particular color bin to be the smaller, or minimum, of the scaled bin value for this color bin or the bin value of the reference color histogram for the reference image (e.g., depicting the reference object to be detected) to which the test image subregion is being compared, as described above. After the bin values of the test color histogram have been adjusted (block 1025), at block 1030 the bin adjuster 415 outputs the adjusted bin values determined for the test color histogram of the test image subregion. Execution of the example machine readable instructions 840 then ends.

Example machine readable instructions 845 that may be used to implement the comparison metric determiner 420 of the histogram comparator 135, and/or to perform the processing at block 845 of FIG. 8, are illustrated in FIG. 11. With reference to the preceding figures, execution of the machine readable instructions 845 of FIG. 11 begins at block 1105 at which the comparison metric determiner 420 obtains the reference color histogram for the reference image depicting the reference object that is to be detected in the test image and, more specifically, in a particular test image subregion being processed. At block 1110, the comparison metric determiner 420 obtains the adjusted test color histogram having adjusted bin values as determined by, for example, the bin adjuster 415, the example machine readable instructions 840, etc. At block 1115, the comparison metric determiner 420 begins determining differences between bin values of the reference color histogram and respective adjusted bin values of the adjusted test color histogram. For example, at block 1120, the comparison metric determiner 420 determines, for each color bin, a difference between the bin value of the reference color histogram and the adjusted bin value of the test color histogram for the particular color bin. After the differences for all color bins have been determined (block 1125), at block 1130 the comparison metric determiner 420 sums the difference values determined for each color bin to determine the comparison metric quantifying comparison of the reference image with the test image subregion. Execution of the example machine readable instructions 845 then ends.

Figure 12:
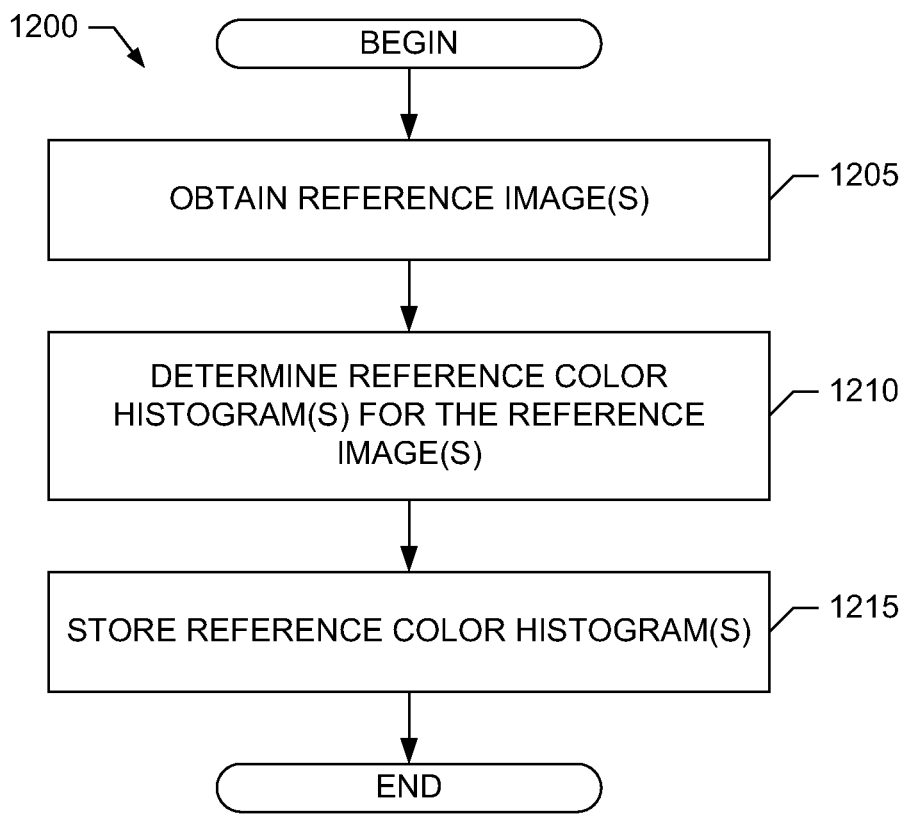
FIG. 12 is a flowchart representative of example machine readable instructions that may be executed to determine a set of reference color histograms for a set of reference images depicting reference objects to be detected by the example image object detection system of FIG. 1.

Example machine readable instructions 1200 that may be executed to determine the reference color histograms stored in the reference histogram library 115 of the example image object detection system 100 and/or obtained at block 815 of example machine readable instructions 800 are represented by the flowchart shown in FIG. 12. With reference to the preceding figures, execution of the example machine readable instructions 1200 of FIG. 12 begins at block 1205 at which the histogram generator 110 obtains the reference image(s) from the reference image library 105 for which reference color histogram(s) is(are) to be determined. At block 1210, the histogram generator 110 determines the reference color histogram(s) for the reference image(s) obtained at block 1205, as described above. For example, the histogram generator 110 can execute the example machine readable instructions 835 illustrated in FIG. 9 to determine the reference color histogram(s) at block 1210. At block 1215, the histogram generator 110 stores the generated reference color histogram(s) in the reference histogram library 115. Execution of the example machine readable instructions 1200 then ends.

Figure 13:
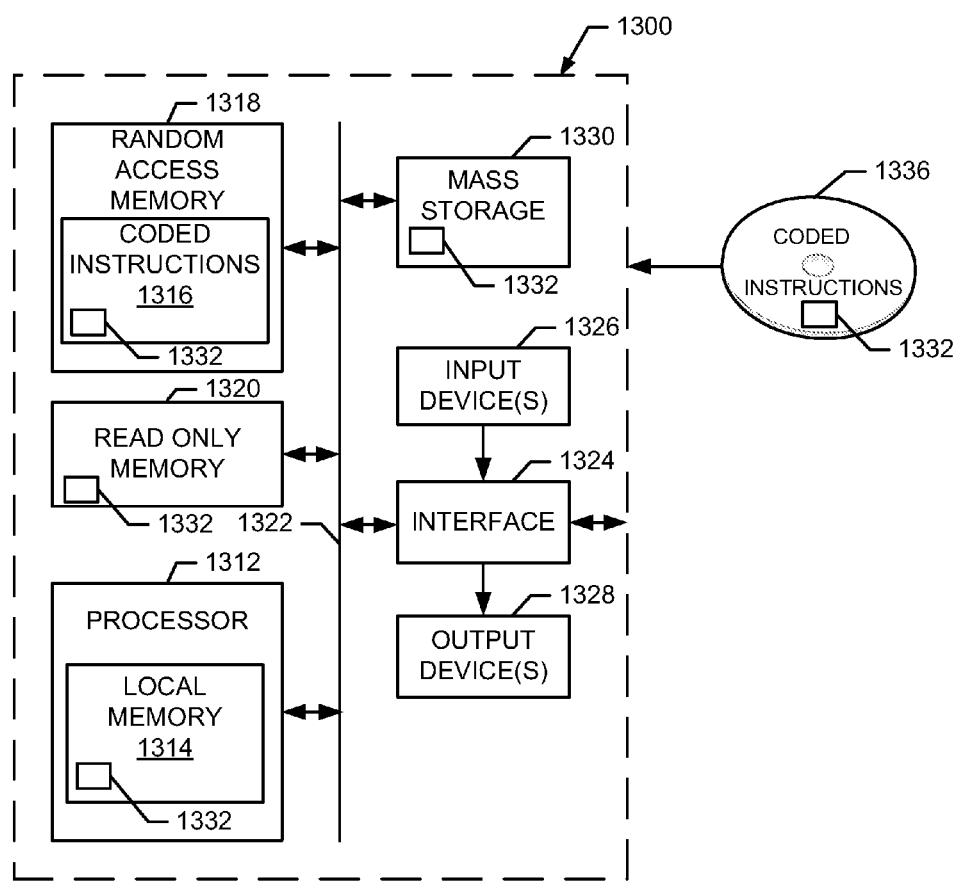
FIG. 13 is a block diagram of an example processing system that may execute the example machine readable instructions of FIGS. 8-11 and/or 12 to implement the example image object detection system of FIG. 1, the example image segmenter of FIG. 2, the example histogram generator of FIG. 3, the example histogram comparator of FIG. 4, the example bin adjuster of FIG. 5, the example comparison metric determiner of FIG. 6 and/or the example object locator of FIG. 7.

FIG. 13 is a block diagram of an example processing system 1300 capable of executing the instructions of FIGS. 8-12 to implement the example image object detection system 100, the example histogram generators 110, 130 and/or 300, the example test interface 120, the example image segmenter 125, the example histogram comparator 135, the example object locator 140, the example subregion selector 205, the example iteration controller 210, the example image sampler 305, the example color quantizer 310, the example color counter 315, the example histogram formatter 320, the example test histogram interface 405, the example reference histogram interface 410, the example bin adjuster 415, the example comparison metric determiner 420, the example threshold comparator 425, the example bin scaler 505, the example value selector 510, the example bin difference determiner 605, the example difference summer 610, the example detected subregion highlighter 705 and/or the example location detector 710 of FIGS. 1-7. The processing system 1300 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1300 of the instant example includes a processor 1312. For example, the processor 1312 can be implemented by one or more microprocessors and/or controllers from any desired family or manufacturer. The processor 1312 includes a local memory 1314, and executes coded instructions 1316 present in the local memory 1314 and/or in another memory device.

The processor 1312 is in communication with a main memory including a volatile memory 1318 and a non-volatile memory 1320 via a bus 1322. The volatile memory 1318 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1320 may be implemented by flash memory and/or any other desired type of memory device. Access to the main memory, including the memories 1318 and 1320, is controlled by a memory controller.

The processing system 1300 also includes an interface circuit 1324. The interface circuit 1324 may be implemented by any type of interface standard, such as an Ethernet interface, a universal serial bus (USB), and/or a PCI express interface.

One or more input devices 1326 are connected to the interface circuit 1324. The input device(s) 1326 permit a user to enter data and commands into the processor 1312. The input device(s) can be implemented by, for example, a keyboard, a mouse, a touchscreen, a track-pad, a trackball, a trackbar (such as an isopoint), a voice recognition system, and/or any other human-machine interface.

One or more output devices 1328 are also connected to the interface circuit 1324. The output devices 1328 can be implemented, for example, by display devices (e.g., a liquid crystal display, a cathode ray tube display (CRT)), by a printer and/or by speakers. The interface circuit 1324, thus, typically includes a graphics driver card.

The interface circuit 1324 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1300 also includes one or more mass storage devices 1330 for storing machine readable instructions and data. Examples of such mass storage devices 1330 include floppy disk drives, hard drive disks, compact disk drives and digital versatile disk (DVD) drives. In some examples, the mass storage device 1330 may implement the reference image library 105 and/or the reference histogram library 115. Additionally or alternatively, in some examples the volatile memory 1318 may implement the reference image library 105 and/or the reference histogram library 115.

Coded instructions 1332 corresponding to the instructions of FIGS. 8-12 may be stored in the mass storage device 1330, in the volatile memory 1318, in the non-volatile memory 1320, in the local memory 1314 and/or on a removable storage medium, such as a CD or DVD 1336.

As an alternative to implementing the methods and/or apparatus described herein in a system such as the processing system of FIG. 13, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to detect an object in an image, the method comprising:
    segmenting the image into sets of subregions, different sets having at least one of different subregion sizes or different subregion offsets relative to one another;
    determining a first comparison metric quantifying comparison of a first subregion with the object based on differences between bin values of a second color histogram corresponding to the object and adjusted bin values of a first color histogram corresponding to the first subregion;

determining a second comparison metric quantifying comparison of a second subregion with the object; and comparing the first and second comparison metrics with a threshold to identify at least one of the subregions as being associated with a possible location of the object in the image.

2. A method as defined in claim 1 further comprising:

scaling the bin values of the first color histogram by a scale factor to determine scaled bin values of the first color histogram; and determining an adjusted bin value of the first color histogram for a particular color bin to be a smaller of a scaled bin value of the first color histogram for the particular color bin and a respective bin value of the second color histogram for the particular color bin.

3. A method as defined in claim 2 wherein the scale factor is substantially equal to two.

4. A method as defined in claim 1 wherein determining the first comparison metric comprises:

determining the differences between the bin values of the second color histogram and the respective adjusted bin values of the first color histogram; and summing the differences to determine the first comparison metric.

5. A method as defined in claim 1 further comprising obtaining the first color histogram corresponding to the first subregion by:

quantizing color values of pixels forming the first subregion; and including the pixels in color bins of the first color histogram, a first pixel being included in a first one of the color bins based on a combination of quantized color values of the first pixel and quantized color values of a set of one or more other pixels in a neighborhood of the first pixel.

6. A method as defined in claim 1 further comprising:

identifying a subset of the sets of subregions having respective comparison metrics that meet the threshold; and depicting the subset of the sets of subregions in a presentation of the image to depict possible locations of the object in the image.

7. A method as defined in claim 1 further comprising:

identifying a subset of the sets of subregions having respective comparison metrics that meet the threshold; and combining location information for the subregions in the subset to estimate a location of the object in the image.

8. A tangible machine readable medium storing machine readable instructions which, when executed, cause a machine to at least:

segment an image into sets of subregions, different sets having at least one of different subregion sizes or different subregion offsets relative to one another;

determine a first comparison metric quantifying comparison of a first subregion with the object based on differences between bin values of a second color histogram corresponding to the object and adjusted bin values of a first color histogram corresponding to the first subregion;

determine a second comparison metric quantifying comparison of a second subregion with the object; and compare the first and second comparison metrics with a threshold to identify at least one of the subregions as being associated with a possible location of the object in the image.

9. A tangible machine readable medium as defined in claim 8 wherein the machine readable instructions, when executed, further cause the machine to:

scale the bin values of the first color histogram by a scale factor to determine scaled bin values of the first color histogram; and determine an adjusted bin value of the first color histogram for a particular color bin to be a smaller of a scaled bin value of the first color histogram for the particular color bin and a respective bin value of the second color histogram for the particular color bin.

10. A tangible machine readable medium as defined in claim 9 wherein the scale factor is substantially equal to two.

11. A tangible machine readable medium as defined in claim 8 wherein the machine readable instructions, when executed, further cause the machine to:

determine the differences between the bin values of the second color histogram and the respective adjusted bin values of the first color histogram; and sum the differences to determine the first comparison metric.

12. A tangible machine readable medium as defined in claim 8 wherein to obtain the first color histogram corresponding to the first subregion, the machine readable instructions, when executed, further cause the machine to:

quantize color values of pixels forming the first subregion; and include the pixels in color bins of the first color histogram, a first pixel being included in a first one of the color bins based on a combination of quantized color values of the first pixel and quantized color values of a set of one or more other pixels in a neighborhood of the first pixel.

13. A tangible machine readable medium as defined in claim 8 wherein the machine readable instructions, when executed, further cause the machine to:

identify a subset of the sets of subregions having respective comparison metrics that meet the threshold; and depict the subset of the sets of subregions in a presentation of the image to depict possible locations of the object in the image.

14. A tangible machine readable medium as defined in claim 8 wherein the machine readable instructions, when executed, further cause the machine to:

identify a subset of the sets of subregions having respective comparison metrics that meet the threshold; and combine location information for the subregions in the subset to estimate a location of the object in the image.

15. An apparatus to detect an object in an image, the apparatus comprising:

a histogram generator to generate respective test color histograms for subregions in sets of subregions of the image, different sets having at least one of different subregion sizes or different subregion offsets relative to one another; and a histogram comparator to:

determine comparison metrics quantifying comparison of respective ones of the subregions with the object, a first comparison metric quantifying comparison of a first subregion with the object being based on differences between bin values of a reference color histogram corresponding to the object and respective adjusted bin values of a respective one of the test color histograms corresponding to the first subregion; and compare the comparison metrics with a threshold to identify at least one of the subregions as being associated with a possible location of the object in the image.

16. An apparatus as defined in claim 15 wherein the histogram comparator is to:
- scale bin values of the test color histogram by a scale factor to determine the scaled bin values of the test color histogram; and
- determine an adjusted bin value of the test color histogram for a particular color bin to be a smaller of a scaled bin value of the test color histogram for the particular color bin and a respective bin value of the reference color histogram for the particular color bin.

17. An apparatus as defined in claim 15 wherein the scale factor is substantially equal to two.

18. An apparatus as defined in claim 15 wherein the histogram comparator is to determine the first comparison metric to be a sum of differences between the bin values of the reference color histogram and the respective adjusted bin values of the test color histogram.

19. An apparatus as defined in claim 15 wherein to generate the test color histogram corresponding to the first subregion, the histogram generator is to:

quantize color values of pixels forming the first subregion; and include the pixels in color bins of the test color histogram, a first pixel being included in a first one of the color bins based on a combination of quantized color values of the first pixel and quantized color values of a set of one or more other pixels in a neighborhood of the first pixel.

20. An apparatus as defined in claim 15 further comprising an object locator to:

- identify a subset of the sets of subregions having respective comparison metrics that meet the threshold;
- depict the subset of the sets of subregions in a presentation of the image to depict possible locations of the object in the image; and
- combine location information for the subregions in the subset to estimate a location of the object in the image.

* * * * *